(12) United States Patent
Lin

(10) Patent No.: US 7,808,598 B2
(45) Date of Patent: Oct. 5, 2010

(54) LIQUID CRYSTAL DISPLAY DEVICE HAVING A COMMON ELECTRODE SUBSTRATE

(75) Inventor: Bi-Ly Lin, Tainan (TW)

(73) Assignee: Chimei Innolux Corporation (TW)

( * ) Notice: Subject to any disclaimer, the term of this patent is extended or adjusted under 35 U.S.C. 154(b) by 194 days.

(21) Appl. No.: 12/101,341

(22) Filed: Apr. 11, 2008

(65) Prior Publication Data

US 2008/0266495 A1      Oct. 30, 2008

(30) Foreign Application Priority Data

Apr. 12, 2007    (TW)  .............................. 96112819 A

(51) Int. Cl.
*G02F 1/1345*        (2006.01)

(52) U.S. Cl. ...................................................... 349/149
(58) Field of Classification Search .................. 349/149
See application file for complete search history.

(56) References Cited

U.S. PATENT DOCUMENTS 5,739,880 A * 4/1998 Suzuki et al. ............... 349/110

* cited by examiner

*Primary Examiner*—Jerry T Rahll
(74) *Attorney, Agent, or Firm*—Trop Pruner & Hu, P.C.

(57) ABSTRACT

A common electrode substrate for use in a liquid crystal display (LCD) device includes a substrate body, a common electrode disposed on the substrate body, and a peripheral first circuit disposed on the substrate body. The peripheral first circuit and the common electrode are electrically separate from each other, and the peripheral first circuit extends along at least a portion of a peripheral region of the substrate body.

29 Claims, 8 Drawing Sheets

LIQUID CRYSTAL DISPLAY DEVICE HAVING A COMMON ELECTRODE SUBSTRATE

CROSS-REFERENCE TO RELATED APPLICATION

This claims priority under 35 U.S.C. §119 of Taiwan Patent Application No. 96112819, filed Apr. 12, 2007, which is hereby incorporated by reference.

TECHNICAL FIELD

The present invention relates to a common electrode substrate for use in a liquid crystal display device.

BACKGROUND

Liquid crystal display (LCD) devices exhibit various desirable characteristics, including, as examples, high definition, good space utilization, low power consumption, and no or low radiation. FIG. 1 is a schematic sectional view of a conventional LCD device 100. The LCD device 100 includes a pixel electrode array substrate 110, a color filter substrate 120, and a liquid crystal layer 130 between substrates 110 and 120. The liquid crystal layer 130 is encapsulated between the pixel electrode array substrate 110 and the color filter substrate 120 by use of a sealant 140. Conventionally, a portion of the pixel electrode array substrate 110 that is in a non-display (peripheral) region R10 has peripheral circuits such as driving line(s), repair line(s), and bus line(s). However, due to reduction of sizes of parts of conventional LCD devices, including parts in the non-display region R10, it can be difficult to accommodate the various lines noted above in the non-display region R10. Moreover, the impedance of the lines may be greatly increased as line widths are reduced to achieve size reduction of LCD device parts. Also, if the space available to accommodate electrical lines in the non-display region R10 is too small, then that may lead to low yield during manufacturing.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION

Figure 1:
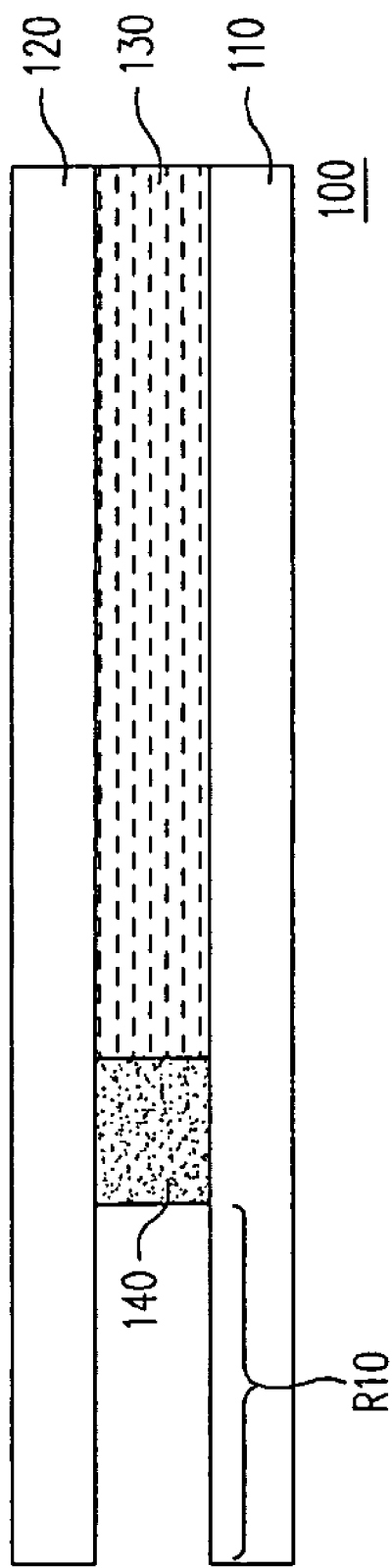
FIG. 1 is a schematic cross-sectional view of a conventional liquid crystal display (LCD) device.
Figure 2:
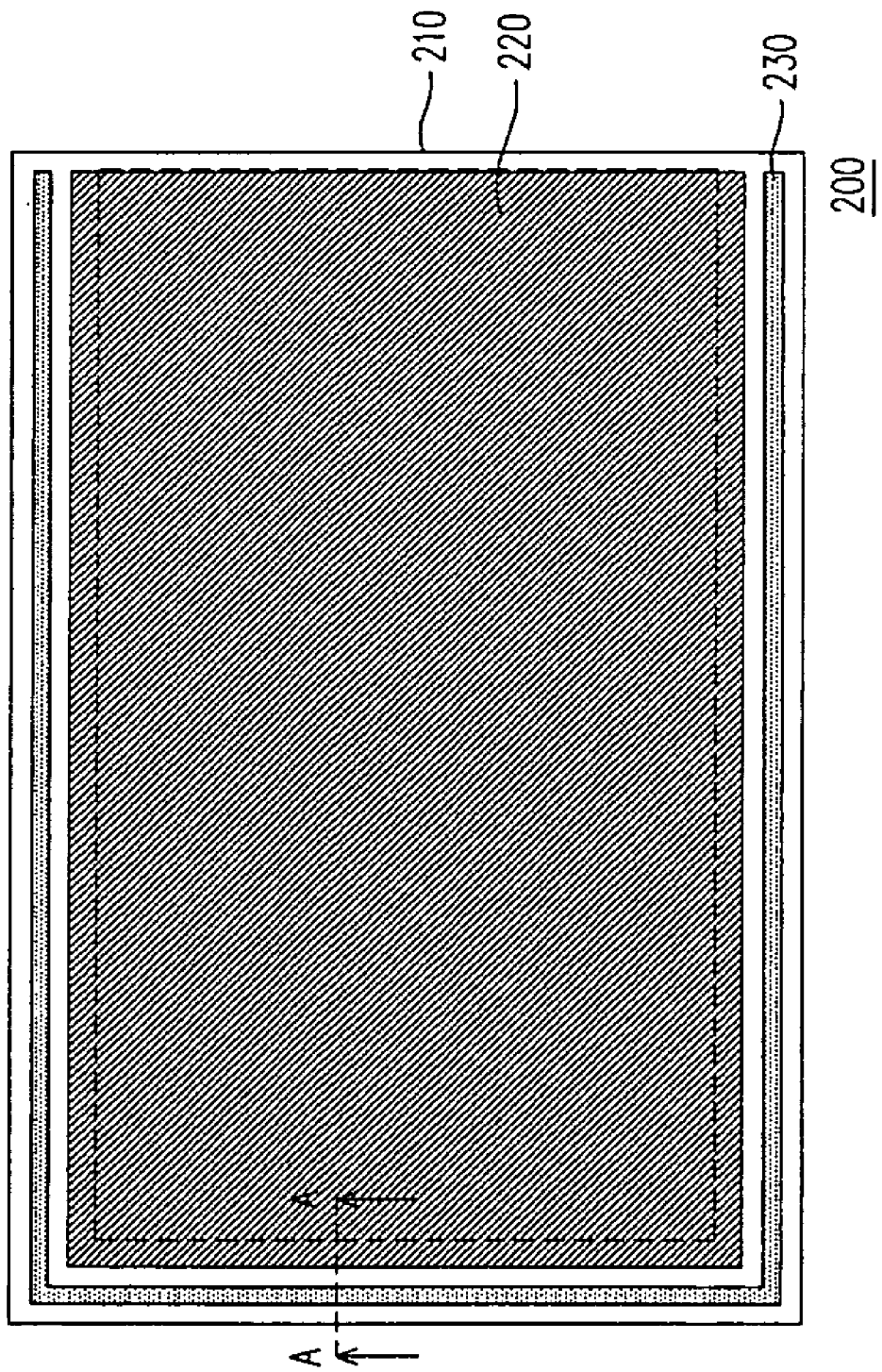
FIG. 2 is a top view of a common electrode substrate according to an embodiment of the present invention.
Figure 3:
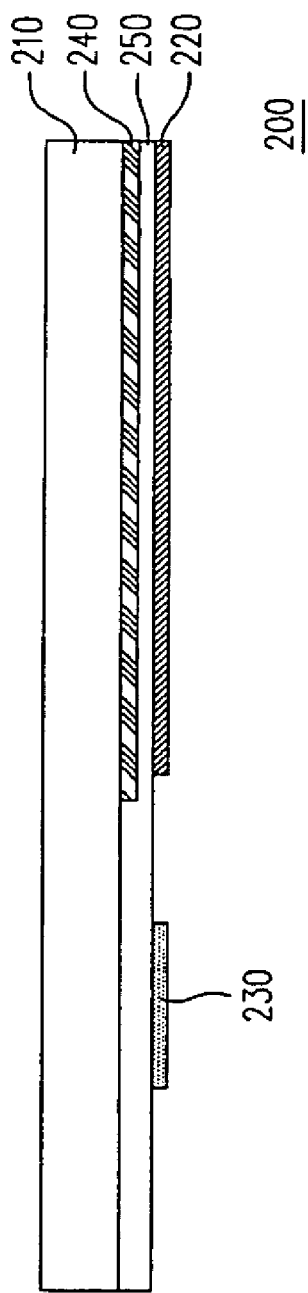
FIG. 3 is a cross-sectional view of the common electrode substrate of FIG. 2 taken along line A-A.

FIG. 2 is a top view of a common electrode substrate according to an embodiment of the present invention that is part of a liquid crystal display (LCD) device (not shown). FIG. 3 is a cross-sectional view of the common electrode substrate of FIG. 2 taken along line A-A. The common electrode substrate 200 includes a substrate body 210, a common electrode 220, and a peripheral first circuit 230. As explained further below, the peripheral first circuit 230 can include various electrical lines. The common electrode 220 and peripheral first circuit 230 are disposed on the substrate body 210. The common electrode 220 and first circuit 230 are considered to be "disposed on" the substrate body 210 if the common electrode 220 and first circuit have some fixed arrangement (e.g., over, under, in contact with) with respect to the substrate body 210, whether directly or indirectly.

The first circuit 230 and the common electrode 220 are electrically separated from each other. As depicted in FIG. 2, the peripheral portion of the common electrode substrate 200 can be used as wiring space to accommodate the first circuit 230. The peripheral portion of the common electrode substrate 200 refers to a portion that extends along a periphery (or peripheral region) of the common electrode substrate 200. By using the common electrode substrate 200 in an LCD device to accommodate the peripheral first circuit 230 in accordance with some embodiments, the overall size of the LCD device can be reduced, and issues associated with layout and high impedance of electrical lines in peripheral regions of substrates in an LCD device can be reduced or eliminated.

As depicted further below, the common electrode substrate 200, in an LCD device, is disposed opposite a pixel electrode array substrate, with a liquid crystal layer between the common electrode substrate 200 and the pixel electrode array substrate. The common electrode 220 can be set at a predetermined voltage to provide a reference for pixel electrodes, such that electric fields can be generated between the pixel electrodes and common electrode to control tilt angles of liquid crystal molecules in the liquid crystal layer.

Figure 4:
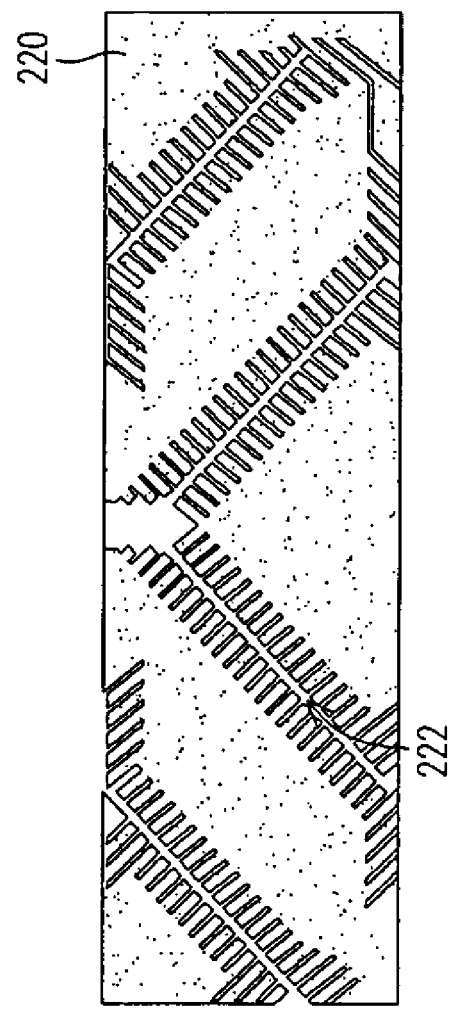
FIG. 4 is a partial top view of a portion of the common electrode of FIG. 2.

In one embodiment, the common electrode 220 is "complete"; in other words, the common electrode 220 is a complete conductive layer (without the presence of openings or slits). However, in a multi-domain vertical alignment (MVA) LCD device, the common electrode 220 is designed to have a plurality of jagged slits (or other openings) 222, as shown in FIG. 4. The material of the common electrode 220 can be ITO (indium tin oxide) or other suitable transparent material.

The common electrode substrate 200 can further include a color filter layer 240 (FIG. 3) disposed between the substrate body 210 and the common electrode 220, such that an LCD device incorporating the common electrode substrate 200 can display full color. However, in other embodiments, the color filter layer 240 may also be formed on another substrate in the LCD device.

In addition, the common electrode substrate 200 can further include a passivation layer 250 disposed between the color filter layer 240 and the common electrode 220 to protect the color filter layer 240.

Further, the common electrode 220 and the first circuit 230 can be made of the same material. In other words, the common electrode 220 and the first circuit 230 can be formed by performing one photolithography etching process on the same material layer without adding other processes. However, in other embodiments, the common electrode 220 and the first circuit 230 can also be made of different material layers. As examples, the material of the first circuit 230 can be ITO, metal, or other suitable materials.

The first circuit 230 can include one or more electrical lines, such as a repair line (to use for repairing defective lines), a bus line (e.g., a common bus line for providing one of the potentials of pixel storage capacitors on a pixel electrode array substrate), a driving line (to drive pixel data signals), and/or other lines. Basically, the first circuit 230 provides line(s) that are typically provided in the periphery of a pixel electrode array substrate. However, by providing the first circuit 230 on the common electrode substrate instead, various benefits can be achieved, as noted above.

In FIG. 2, the first circuit 230 extends along each of three sides of the substrate body 210. In alternative embodiments, the first circuit 230 can extend along just one side of the substrate body 210, two sides of the substrate body 210, or around the entire periphery of the substrate body 210. As noted above, the first circuit 230 can be a single electrical line or a combination of multiple lines.

Figure 5:
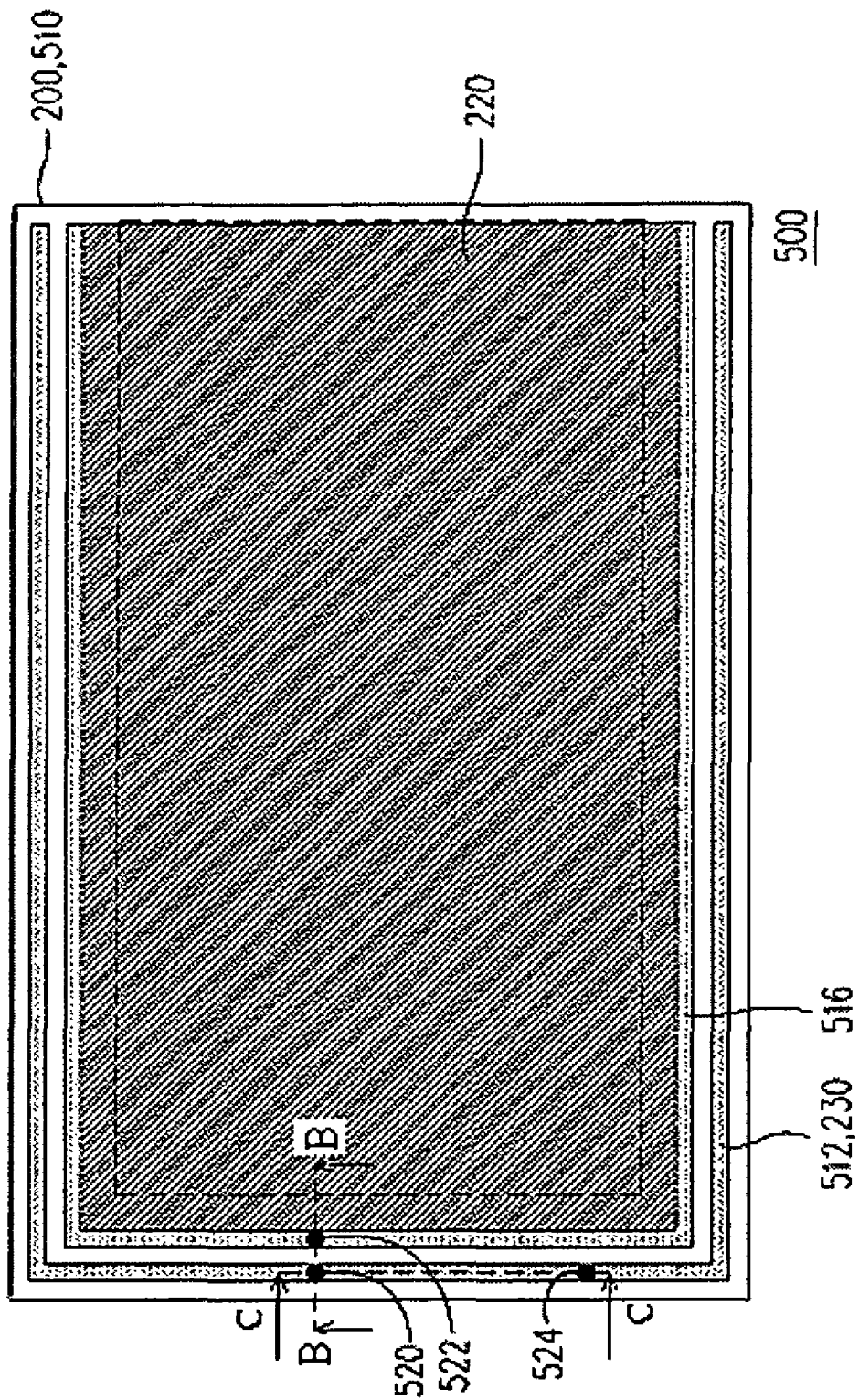
FIG. 5 is a top view of an LCD device incorporating the common electrode substrate of FIG. 2 according to an embodiment.
Figure 6:
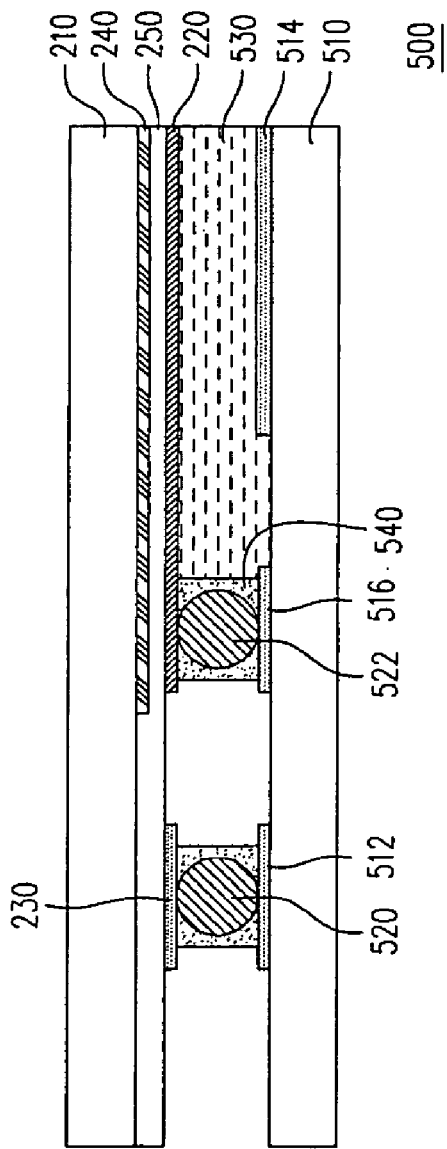
FIG. 6 is a cross-sectional view of the LCD device of FIG. 5 taken along line B-B.

FIG. 5 is a top view of an LCD device that incorporates the common electrode substrate in FIG. 2, and FIG. 6 is a cross-sectional view of the LCD device of FIG. 5 taken along line B-B. The LCD device 500 includes the common electrode substrate 200 described above, a pixel electrode array substrate 510, a first conductive structure 520, a second conductive structure 522, and a liquid crystal layer 530 (FIG. 6). The components of the common electrode substrate 200 are assigned the same reference numerals as in FIGS. 2 and 3. The pixel electrode array substrate 510 is opposite to the common electrode substrate 200, and has a pixel electrode array 514, a peripheral second circuit 512, and a third circuit 516 (FIG. 6). The first conductive structure 520 is disposed between and electrically connected to the peripheral first circuit 230 and the peripheral second circuit 512. The second conductive structure 522 is disposed between and electrically connected to the third circuit 516 and the common electrode 220. The common electrode 220 is set by the third circuit 516 to a common potential through the second conductive structure 522. The liquid crystal layer 530 is disposed between the pixel electrode array substrate 510 and the common electrode substrate 200.

Since the peripheral first circuit 230 is located on the periphery of the common electrode substrate 200, and the peripheral first circuit 230 is electrically connected to the peripheral second circuit 512 through the first conductive structure 520, some of the functions of the peripheral second circuit 512 in conventional LCD devices can at least be partially carried out by the peripheral first circuit 230. In other words, the peripheral portions of the pixel electrode array substrate 510 and the common electrode substrate 200 can both be used together to provide peripheral circuits of an LCD device. Also, the overall size of the LCD device 500 can be reduced due to the presence of the peripheral first circuit 230 disposed on the common electrode substrate 200. Moreover, since additional wiring space is available due to use of both peripheral portions of the common electrode substrate and pixel electrode array substrate for peripheral circuits, line width can be increased or more lines can be connected in parallel to reduce impedance.

In the embodiment of FIGS. 5 and 6, the LCD device 500 further includes a sealant 540 for encapsulating the liquid crystal layer 530 between the pixel electrode array substrate 510 and the common electrode substrate 200.

Moreover, the first conductive structure 520 and the second conductive structure 522 can be formed of one or more metallic balls (e.g., gold balls). The second conductive structure 522 can be positioned by the sealant 540 when the sealant 540 is coated around the second conductive structure 522. The first conductive structure 520 can also be positioned by a sealant around the first conductive structure 520. Alternatively, the first conductive structure 520 and the second conductive structure 522 can be positioned by use of metallic (e.g., silver) paste or other suitable conductive substances.

Figure 7:
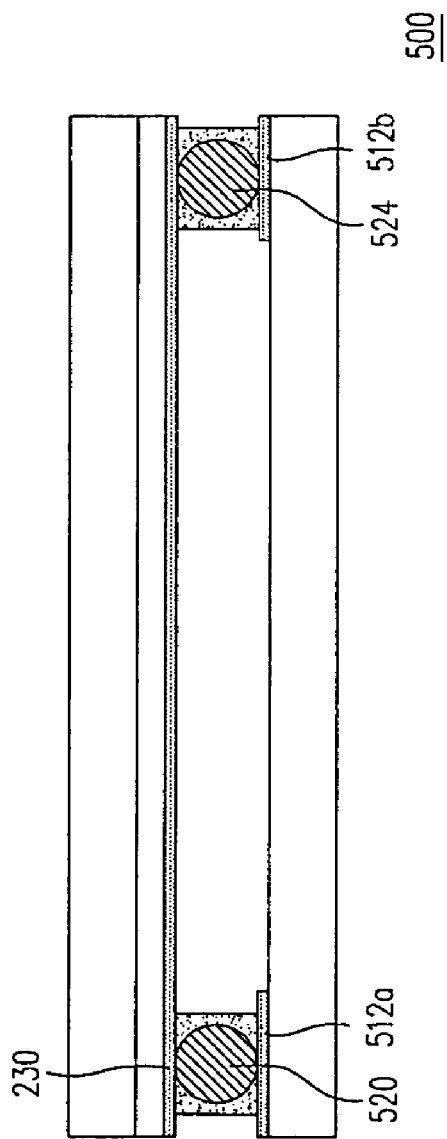
FIG. 7 is a cross-sectional view of the LCD device of FIG. 5 taken along line C-C.

FIG. 7 is a sectional view of the LCD device in FIG. 5 taken along line C-C. Referring to FIGS. 5 and 7, the LCD device 500 may further include a third conductive structure 524 disposed between and electrically connected to the first circuit 230 and the peripheral second circuit 512. Moreover, the peripheral second circuit 512 of this embodiment is not a continuous circuit, but can include a first portion 512a and a second portion 512b separated from each other. The first portion 512a is electrically connected with the peripheral first circuit 230 through the first conductive structure 520, and the second portion 512b is electrically connected with the peripheral first circuit 230 through the third conductive structure 524. In other words, the pixel electrode array substrate 510 only has to provide a very small space for the first portion 512a and the second portion 512b of the second circuit 512, as the signal can be transmitted through the peripheral first circuit 230 between the first conductive structure 520 and the third conductive structure 524. As such, the area of the pixel electrode array substrate 510 can be reduced. In addition, the third conductive structure 524 is similar to the first conductive structure 520, and can be gold ball, silver paste, or other suitable conductive substance.

Figure 8:
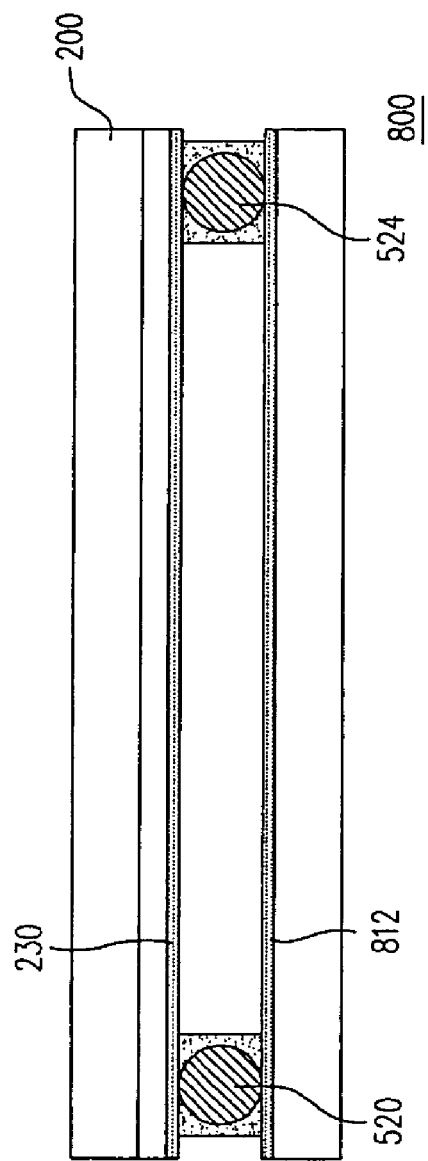
FIG. 8 is a partial cross-sectional view of an LCD device according to another embodiment of the present invention.

FIG. 8 is a partial sectional view of an LCD device according to another embodiment of the present invention, in which the position of the section depicted in FIG. 8 is similar to that of FIG. 7. Referring to FIG. 8, the LCD device 800 is similar to the LCD device 500 in FIG. 7, except that the peripheral second circuit 812 of FIG. 8 is a continuous circuit. In other words, the peripheral first circuit 230 and the peripheral second circuit 812 can be connected with each other through the first conductive structure 520 and the third conductive structure 524. As a result, the equivalent resistance of the lines can be reduced, so as to reduce the power loss of a signal transmitted across the lines. Moreover, the line width of the peripheral first circuit 230 can be reduced to reduce the overall area of the common electrode substrate 200.

Figure 9:
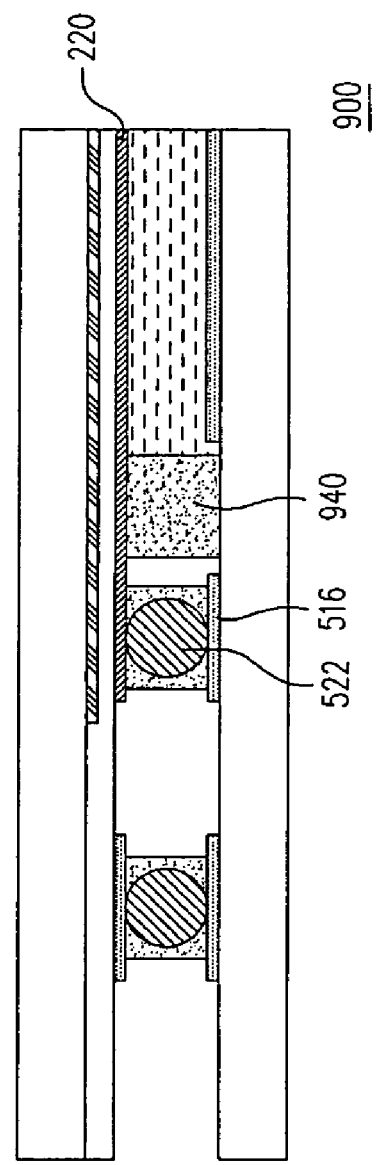
FIGS. 9 to 11 are partial cross-sectional views of an LCD device according to further embodiments of the present invention.
Figure 10:
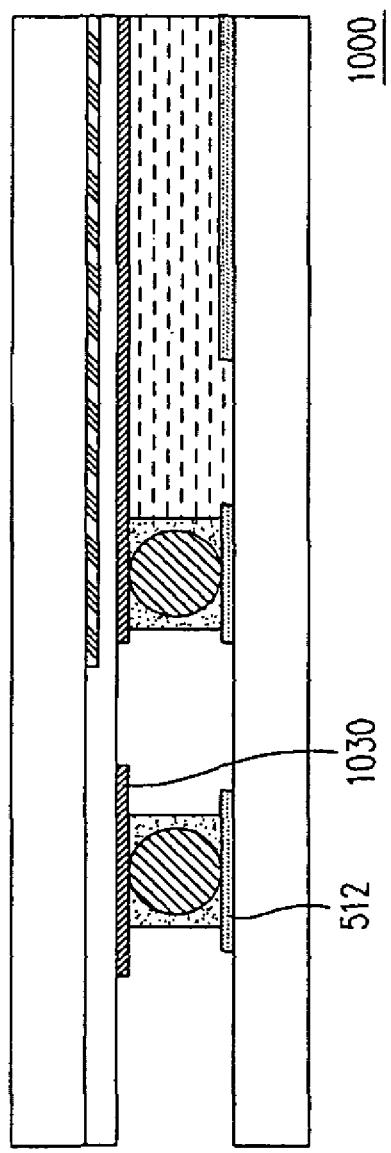
Figure 11:
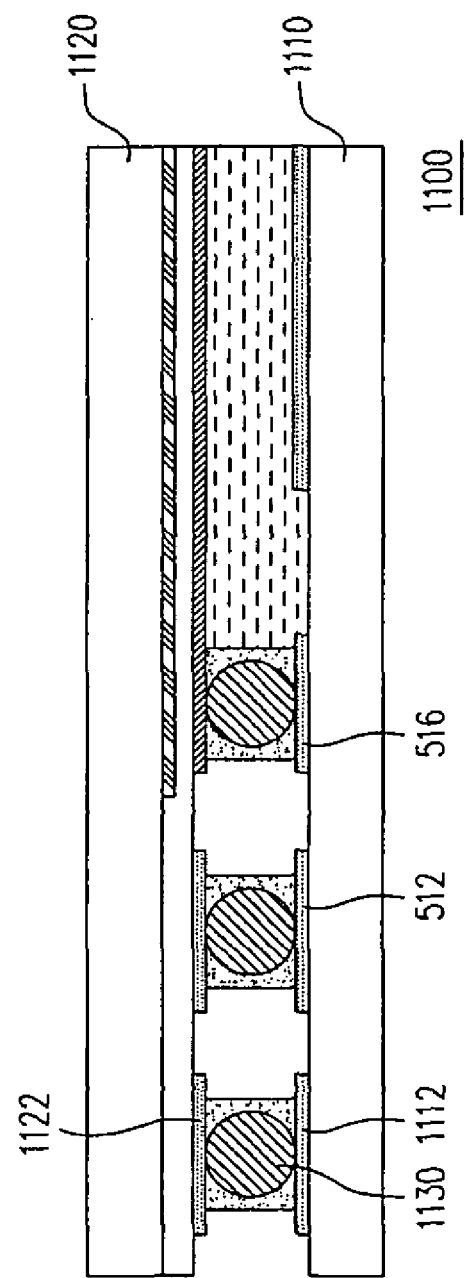

FIGS. 9-11 are partial sectional views of LCD devices according to other embodiments. Referring to FIG. 9, the LCD device 900 is similar to the LCD device 500 in FIG. 6, except that the second conductive structure 522 is independent of the sealant 940. The third circuit 516 is still electrically connected to the common electrode 220 through the second conductive structure 522.

Referring to FIG. 10, the LCD device 1000 of this embodiment is similar to the LCD device 500 in FIG. 6, except that the line width of the peripheral first circuit 1030 is greater than the line width of the peripheral second circuit 512. As a result, the resistance of the peripheral first circuit 1030 is reduced. Such a design is especially useful when the material of the first circuit 1030 has poor conductivity.

Referring to FIG. 11, the LCD device 1100 of this embodiment is similar to the LCD device 500 in FIG. 6, except that the pixel electrode array substrate 1110 further has a peripheral fourth circuit 1112. Meanwhile, the peripheral fourth circuit 1112 is also electrically connected to a peripheral fifth circuit 1122 on the common electrode substrate 1120 through a fourth conductive structure 1130. However, the peripheral fourth circuit 1112 does not necessarily have to be electrically connected to the peripheral fifth circuit 1122. Moreover, the common electrode substrate 1120 can also not be provided with the peripheral fifth circuit 1122. FIG. 11 shows an embodiment in which a plurality of other circuits can be disposed on the pixel electrode array substrate 1110 besides the peripheral second circuit 512 and the third circuit 516. The peripheral fourth circuit 1112 can serve as a repair line, bus line, or other type of line.

Figure 12:
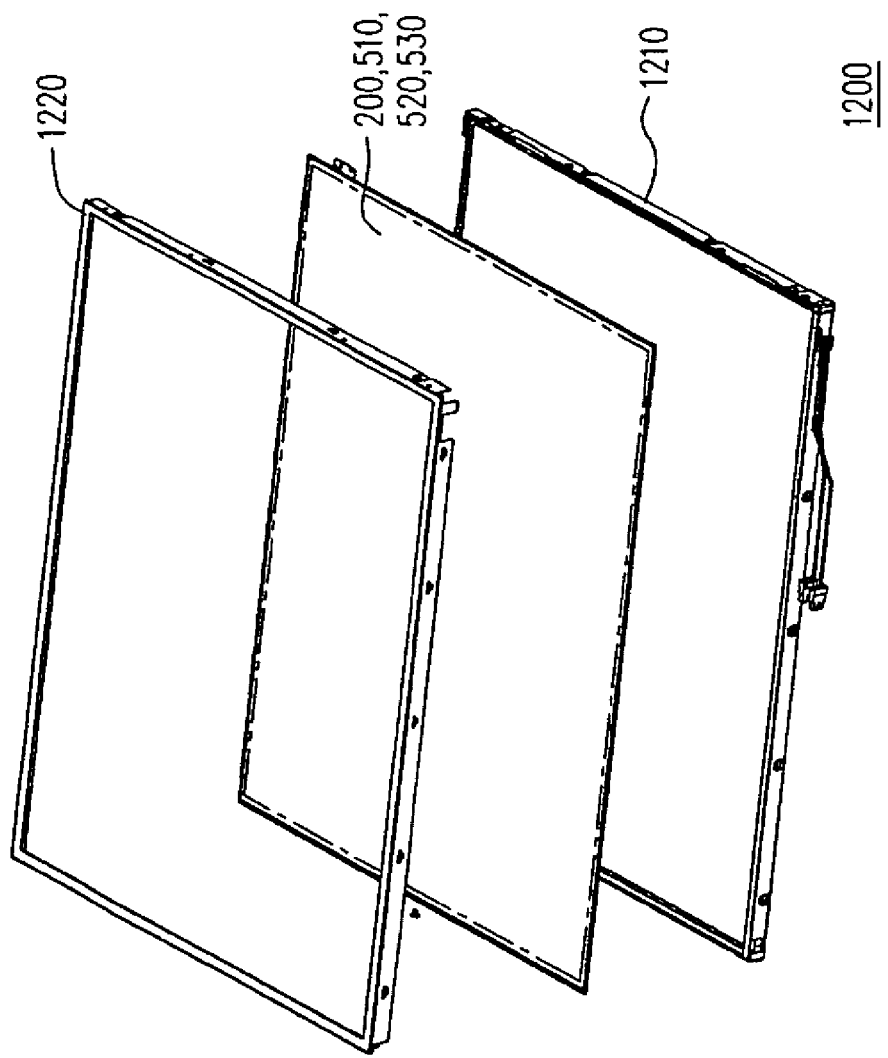
FIG. 12 is an exploded view of the LCD device of FIG. 6 after modification.

FIG. 12 is an exploded view of the LCD device of FIG. 6 after being modified. Referring to FIGS. 12 and 6, the LCD device 1200 includes a backlight module 1210 and a common electrode substrate 200, a pixel electrode array substrate 510, a first conductive structure 520, a second conductive structure 522, and a liquid crystal layer 530 of FIG. 6. The common electrode substrate 200, the pixel electrode array substrate 510, the first conductive structure 520, the second conductive structure 522, and the liquid crystal layer 530 are disposed above the backlight module 1210. In alternative embodiments, the above components can be replaced by other components.

In addition, the LCD device 1200 may further have a front frame 1220 for firmly attaching the common electrode substrate 200, the pixel electrode array substrate 510, the first conductive structure 520, the second conductive structure 522, and the liquid crystal layer 530 on the backlight module 1210.

In accordance with any of the foregoing embodiments, a common electrode substrate of an LCD device provides a peripheral portion to add additional layout space for peripheral circuitry. Therefore, assuming that the overall size of the LCD device stays the same, layout difficulties and impedance issues that exist in conventional LCD devices can be avoided or reduced. According to some embodiments, some lines or other circuitry typically provided on the pixel electrode array substrate can be moved to the common electrode substrate to reduce the overall size of the LCD device.

While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A common electrode substrate, for use in a liquid crystal display (LCD) device, comprising:
   a substrate body;
   a common electrode disposed on the substrate body; and
   a peripheral first circuit, disposed on the substrate body, wherein the peripheral first circuit and the common electrode are electrically separated from each other and the peripheral first circuit extends along at least a portion of a peripheral region of the substrate body.

2. The common electrode substrate as claimed in claim 1, wherein the common electrode is formed without openings.

3. The common electrode substrate as claimed in claim 1, wherein the common electrode has slits.

4. The common electrode substrate as claimed in claim 1, further comprising a color filter layer disposed between the substrate body and the common electrode.

5. The common electrode substrate as claimed in claim 4, further comprising a passivation layer disposed between the color filter layer and the common electrode.

6. The common electrode substrate as claimed in claim 1, wherein the common electrode and the peripheral first circuit are made of the same material.

7. The common electrode substrate as claimed in claim 1, wherein a material of the peripheral first circuit is indium tin oxide (ITO) or metal.

8. The common electrode substrate as claimed in claim 1, wherein the peripheral first circuit is a repair line or bus line.

9. The common electrode substrate as claimed in claim 1, wherein the common electrode and the peripheral first circuit are formed by a single photolithography process.

10. The common electrode substrate of claim 1, wherein the peripheral first circuit extends along at least two sides of the peripheral region of the substrate body.

11. The common electrode substrate as claimed in claim 1, wherein the common electrode and the peripheral first circuit are disposed on a common surface of the substrate body.

12. A liquid crystal display (LCD) device, comprising:
    a first substrate, comprising:
       a substrate body;
       a common electrode disposed on the substrate body;
       a peripheral first circuit, disposed on the substrate body, wherein the peripheral first circuit and the common electrode are electrically separated from each other;
    a second substrate, opposite to the first substrate, and having a pixel electrode array, and a peripheral second circuit, wherein the pixel electrode array is opposite to the common electrode, and the peripheral second circuit is located outside the pixel electrode array;
    a first conductive structure electrically connected between the peripheral first circuit and the peripheral second circuit; and
    a liquid crystal layer, disposed between the first and second substrates.

13. The LCD device as claimed in claim 12, wherein the common electrode completely covers the surface of the substrate body opposite to the pixel electrode array.

14. The LCD device as claimed in claim 12, wherein the common electrode has a plurality of jagged slits.

15. The LCD device as claimed in claim 12, wherein the first substrate further comprises a color filter layer disposed between the substrate body and the common electrode.

16. The LCD device as claimed in claim 15, wherein the first substrate further comprises a passivation layer disposed between the color filter layer and the common electrode.

17. The LCD device as claimed in claim 12, wherein the common electrode and the peripheral first circuit are made of the same material.

18. The LCD device as claimed in claim 12, wherein the peripheral first circuit is a repair line or bus line.

19. The LCD device as claimed in claim 12, further comprising a backlight module, wherein the second substrate, the first substrate, the first conductive structure, the second conductive structure, and the liquid crystal layer are disposed to receive light from the backlight module.

20. The LCD device as claimed in claim 12, wherein the common electrode and the peripheral first circuit are formed by a single photolithography process.

21. The LCD device as claimed in claim 12, further comprising a second conductive structure disposed between and electrically connected to the first circuit and the second circuit.

22. The LCD device as claimed in claim 21, wherein the second circuit comprises a first portion and a second portion separated from each other, the first portion is electrically connected to the first circuit through the first conductive structure, and the second portion is electrically connected to the first circuit through the second conductive structure.

23. The LCD device as claimed in claim 12, wherein the peripheral first circuit extends in a direction that is substantially parallel to a direction in which the peripheral second circuit extends.

24. The LCD device as claimed in claim 12, wherein a line width of the peripheral first circuit is greater than a line width of the peripheral second circuit.

25. The LCD device as claimed in claim 12, wherein the second substrate further has a third circuit.

26. The LCD device as claimed in claim 25, wherein the third circuit is a repair line or bus line.

27. The LCD device as claimed in claim 25, further comprising a second conductive structure, wherein the first substrate further comprising a fourth circuit, and the third circuit is electrically connected to the fourth circuit through the second conductive structure.

28. The LCD device as claimed in claim 12, wherein the second substrate further has a third circuit, and the LCD device further comprises a second conductive structure electrically connected between the third circuit and the common electrode.

29. The LCD device as claimed in claim 12, wherein the common electrode and the peripheral first circuit are disposed on a common surface of the substrate body.

\* \* \* \* \*